United States Patent [19]
Mangyo et al.

[11] Patent Number: 5,606,867
[45] Date of Patent: Mar. 4, 1997

[54] REFRIGERATION SYSTEM FLUID TUBE SEAL

[75] Inventors: Masao Mangyo, Fujisawa; Takao Kawashima, Kawasaki; Yuji Mori, Chigasaki, all of Japan

[73] Assignee: Matsushita Refrigeration Company, Osaka, Japan

[21] Appl. No.: 539,511

[22] Filed: Oct. 6, 1995

Related U.S. Application Data

[62] Division of Ser. No. 295,585, Aug. 25, 1994.

[30] Foreign Application Priority Data

Aug. 26, 1993 [JP] Japan .................................. 5-211650
Aug. 26, 1993 [JP] Japan .................................. 5-211651

[51] Int. Cl.$^6$ .................................................. F25D 19/00
[52] U.S. Cl. .................... 62/298; 62/468; 138/DIG. 1
[58] Field of Search .............................. 62/298, 84, 292, 62/468, 299; 138/DIG. 1, DIG. 7

[56] References Cited

U.S. PATENT DOCUMENTS 4,231,228  11/1980  Galvin et al. ........................... 62/292

Primary Examiner—John M. Sollecito
Attorney, Agent, or Firm—Lowe, Price, LeBlanc & Becker

[57] ABSTRACT

A refrigeration system uses a refrigerant which contains, as a main component, hydrocarbon or HFC-152a. A fluid tube, such as, a gas charge port tube is hermetically connected to a refrigerant flow passage in the refrigeration system for filling at least the refrigerant into the refrigerant flow passage. The fluid tube is sealed against leakage of the refrigerant from the refrigerant flow passage by means of a pinched portion and a squashed portion of a flat-plate shape which extends from the pinched portion to a distal end thereof. The squashed portion may be folded at a plurality of portions for enhancing the sealing effect. Further, instead of the squashed portion, an adhesive may be used for reinforcing the sealing effect provided by the pinched portion. Alternatively or with the use of the adhesive, an elastomer may be used for reinforcing the sealing effect provided by the pinched portion.

6 Claims, 5 Drawing Sheets

REFRIGERATION SYSTEM FLUID TUBE SEAL

This application is a division of application Ser. No. 08/295,585 filed Aug. 25, 1994.

BACKGROUND OF THE INVENTION

1. Field of the Invention

The present invention relates to a refrigeration system for use in, such as, an electric refrigerator.

2. Description of the Prior Art

At the meeting for revising the Montreal Protocol about the ozone layer destructing material in the Ozone Layer Protection Treaty, it was agreed upon to wholly abolish chlorofluorocarbon (CFC) in 1996. It was also agreed upon to realize a large CFC reduction from 1994 to no more than 25% as compared with 1986. In response to this, researches have been actively performed by the associated makers, such as, the refrigerant makers, the refrigeration system makers and the oil makers. As a result of the researches, a refrigerant including, as a main component, chlorine-free fluorocarbon, particularly, known as HFC-134a, has been widely admitted as an alternative refrigerant for a CFC refrigerant including chlorine-containing fluorocarbon, particularly, CFC-12 which has been widely used. Further, in view of required solubility with the HFC-134a refrigerant, a lubricating oil containing an ester oil as a base oil has been developed.

FIG. 8 is a diagram schematically showing a typical conventional refrigeration system 15 as disclosed in, such as, Japanese First (unexamined) Patent Publication No. 4-183788. In FIG. 8, the refrigeration system 15 includes a compressor 10, a condenser 11, a drier 14, an expansion mechanism 12 in the form of a capillary tube and an evaporator 13, which are hermetically connected by piping as shown. Further, in the refrigeration system 15, the foregoing HFC-134a refrigerant and the foregoing ester lubricating oil are hermetically enclosed for circulation in a direction of an arrow as indicated in FIG. 8.

In FIG. 8, numeral 16 denotes a typical conventional gas charge port tube, which will be described later with reference to FIG. 9 and as compared with a preferred embodiment of the present invention.

As is known in the art, it is very difficult to find a lubricating oil which satisfies required solubility with HFC-134a and other properties required for a lubricating oil for use in the refrigeration system. On a practical basis, a lubricating oil satisfying such requirements is limited to the ester lubricating oil. Further, HFC-134a costs 5 to 6 times as high as CFC-12. Moreover, although HFC-134a improves an ozone destruction parameter (ODP), it is said to have some problem in improving a global warming parameter (GWP).

In addition, since the ester oil is inferior in hydrolysis stability and hygroscopic property as compared with a mineral oil or an alkylbenzene oil which has been widely used with, such as, CFC-12, some special equipment is required for dehydration when the ester oil is used. Further, the ester oil costs 3 to 4 times as high as the mineral oil or the alkylbenzene oil. Moreover, the ester oil tends to dissolve organic substances inside the refrigeration system so as to produce contaminants which are likely to block the capillary tube to lower the cooling effect of the refrigeration system. Accordingly, in order to prevent this, component parts of the refrigeration system should be washed in a particular manner, which thus requires additional processes and costs.

SUMMARY OF THE INVENTION

Therefore, it is an object of the present invention to provide an improved refrigeration system.

According to one aspect of the present invention, a refrigeration system comprises a series of a refrigerant flow passage including therein a compressor, a condenser, an expansion mechanism and an evaporator; a refrigerant containing, as a main component, one of hydrocarbon and HFC-152a; a lubricating oil having solubility with the refrigerant; and a fluid tube having a base end hermetically connected to the refrigerant flow passage, a distal end and an intermediate portion extending from the base end to the distal end, the intermediate portion having a first portion which is pinched to be closed and a second portion extending from the first portion to the distal end, the second portion being squashed into a flat-plate shape to be closed.

According to another aspect of the present invention, a refrigeration system comprises a series of a refrigerant flow passage including therein a compressor, a condenser, an expansion mechanism and an evaporator; a refrigerant containing, as a main component, one of hydrocarbon and HFC-152a; lubricating oil having solubility with the refrigerant; and a fluid tube having a base end hermetically connected to the refrigerant flow passage, a distal end and an intermediate portion extending from the base end to the distal end, the intermediate portion having a first portion which is pinched to be closed and a second portion extending from the first portion to the distal end, the second portion receiving therein an adhesive being set so as to reinforce a sealing effect provided by the pinched first portion.

According to another aspect of the present invention, a refrigeration system comprises a series of a refrigerant flow passage including therein a compressor, a condenser, an expansion mechanism and an evaporator; a refrigerant containing, as a main component, one of hydrocarbon and HFC-152a; lubricating oil having solubility with the refrigerant; and a fluid tube having a base end hermetically connected to the refrigerant flow passage, a distal end and an intermediate portion extending from the base end to the distal end, the intermediate portion having a first portion which is pinched to be closed and a second portion extending from the first portion to the distal end, the second portion receiving therein an elastomer having a diameter substantially equal to an inner diameter of the second portion, the second portion having a third portion which is deformed to reduce a sectional area thereof so that an inner wall of the third portion tightly fits on the elastomer.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Now, preferred embodiments of the present invention will be described hereinbelow with reference to the accompanying drawings.

Figure 1:
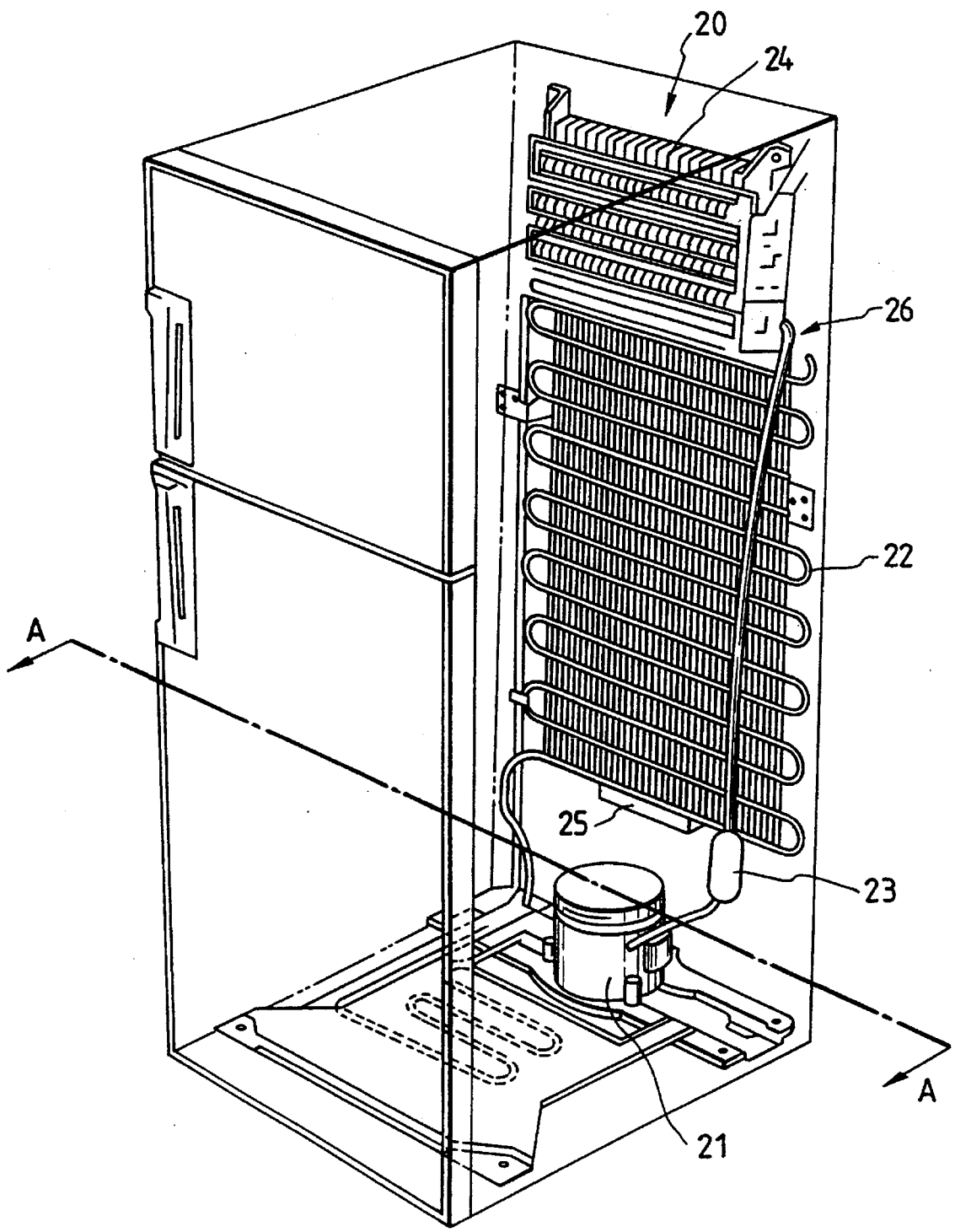
FIG. 1 is a perspective view showing a refrigeration system of an electric refrigerator according to a first preferred embodiment of the present invention.

FIG. 1 shows a refrigeration system 20 of an electric refrigerator according to a first preferred embodiment of the present invention. The refrigeration system 20 includes a compressor 21, a condenser 22, an expansion mechanism 23, an evaporator 24 and a drier 25, which are hermetically connected by piping 26 so as to form a series of a refrigerant flow passage.

Figure 2:
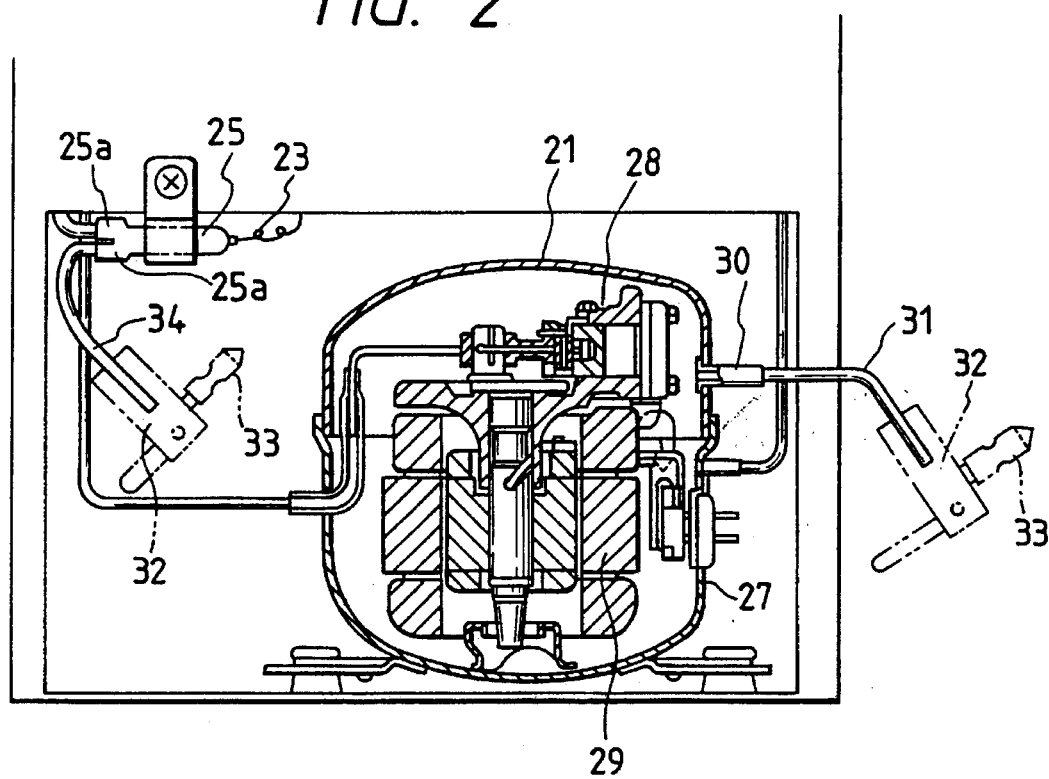
FIG. 2 is a sectional view taken along line A—A in FIG. 1.

FIG. 2 is a sectional view taken along line A—A in FIG. 1. In FIG. 2, the compressor 21 has a sealed casing 27 which includes therein a compression element 28 and a motor element 29 for driving the compression element 28. Numeral 30 denotes a joint tube which is brazed to the sealed casing 27. A gas charge port tube 31 has a base end hermetically coupled to the joint tube 30 and a tip or distal end hermetically closed by an in-process sealing plug 32. The in-process sealing plug 32 is integrally formed with an evacuation port 33 which is closed by a cap in FIG. 2. An evacuation tube 34 has a base end hermetically coupled to one of ports 25a, 25a of the drier 25 and a tip or distal end hermetically closed by the in-process sealing plug 32 with the evacuation port 33 in the same manner as the distal end of the gas charge port tube 31.

In this preferred embodiment, hydrocarbon, such as, propane or butane, or chlorine-free fluorocarbon known as HFC-152is used as a main component of a refrigerant for the refrigeration system 20. Accordingly, both ODP and GWP can be highly improved. Further, the mineral oil or the alkylbenzene oil can be used due to high solubility with hydrocarbon and HFC-152a. Accordingly, the problem of the capillary tube being blocked by the ester produced contaminants can be eliminated to make it unnecessary to wash the component parts of the refrigeration system. Further, the special equipment for dehydration required for the ester oil becomes unnecessary, either. Still further, hydrocarbon costs less as compared with HFC-134a. As a result, according to this preferred embodiment, the refrigeration system can be provided at a reduced cost as compared with the refrigeration system using the HFC-134a refrigerant and the ester lubricating oil.

On the other hand, as appreciated, hydrocarbon and HFC-152a both are combustible. Accordingly, the refrigerant including one of these as a main component can not be dealt with like the refrigerant including HFC-134a as a main component.

Hereinbelow, evacuation of the refrigeration system 20 and filling of the lubricating oil and the refrigerant into the refrigeration system 20 will be described according to this preferred embodiment.

Before the foregoing evacuation and filling, fluid tubes other than the gas charge port tube 31 and the evacuation tube 34 are closed by brazing using naked or open flames, in such a manner as to form the aforementioned series of the refrigerant flow passage through the refrigeration system 20. Subsequently, the in-process sealing plugs 32, 32 are mounted onto the fluid tubes 31 and 34, respectively, as shown in FIG. 2. Thereafter, the evacuation is performed via the evacuation ports 33 until the inside of the refrigeration system 20 reaches a given vacuum value or degree. After the evacuation is finished, the evacuation tube 34 is pinched by a pinching jig (not shown) so as to be closed. Subsequently, the in-process sealing plug 32 is removed from the evacuation tube 34, and the distal end of the evacuation tube 34 is brazed to be closed using the open flames. It may be arranged to first pinch the distal end of the evacuation tube 34 and then braze the pinched distal end using the open flames.

Thereafter, a coupler (not shown) is mounted onto the evacuation port 33 of the in-process sealing plug 32 attached to the gas charge port tube 31 for filling a given amount of the mineral or alkylbenzene lubricating oil into the refrigerant flow passage of the refrigeration system 20 via the evacuation port 33. Subsequently, the refrigerant containing, as a main component, hydrocarbon, such as, propane or butane, or HFC-152a, is filled into the refrigerant flow passage via the evacuation port 33.

Figure 3:
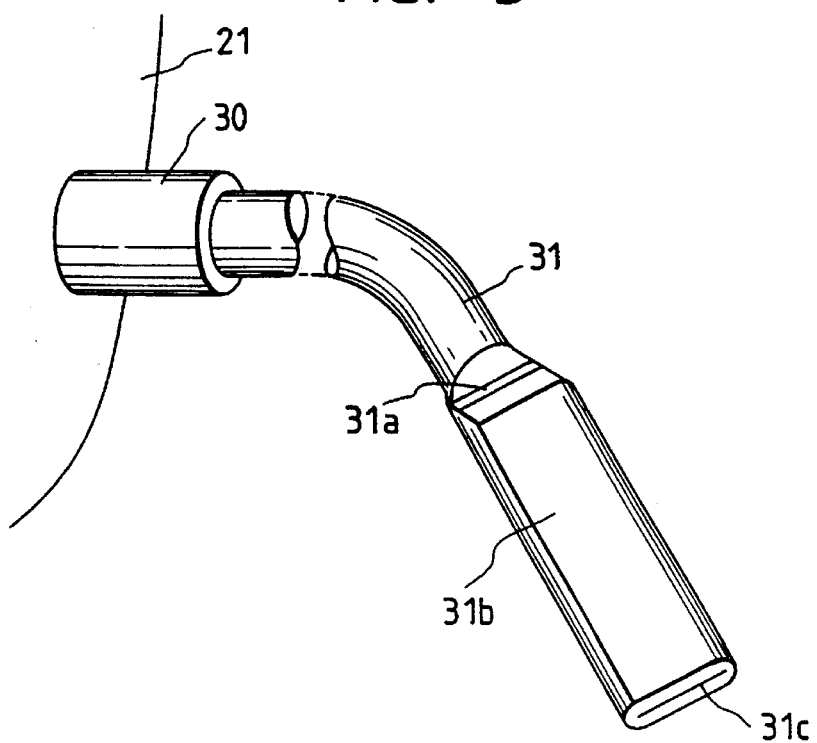
FIG. 3 is a perspective view showing a gas charge port tube shown in FIG. 2, in the state where the gas charge port tube is sealed according to the first preferred embodiment.

Finally, the gas charge port tube 31 is closed or sealed in the following manner:

In FIG. 3, a pinch portion 31a of the gas charge port tube 31 is first pinched to be closed using the pinching jig, and then the in-process sealing plug 32 is removed from the gas charge port tube 31. Subsequently, a portion 31b of the gas charge port tube 31 extending from the pinch portion 31a to the distal end 31c is squashed or crushed into a flat-plate shape to be closed using the pinching jig or a roller jig (not shown). In this preferred embodiment, the gas charge port tube 31 is formed by an annealed deoxidized copper tube so that the squash of the portion 31b can be easily performed.

A length of the portion 31b to be squashed is set to be relatively long. Specifically, the length thereof is determined to a value which ensures no leakage of the combustible refrigerant gas via the gas charge port tube 31 when the portion 31b is squashed by the jig. As a result, the distal end 31c of the gas charge port tube 31 can be sealed not only by soldering using a soldering iron but also by brazing using the open flames or by gas or seam welding, without danger of explosion or fire.

For comparison, a conventional sealing manner of the gas charge port tube 16 will be described hereinbelow with reference to FIG. 9.

Figure 9:
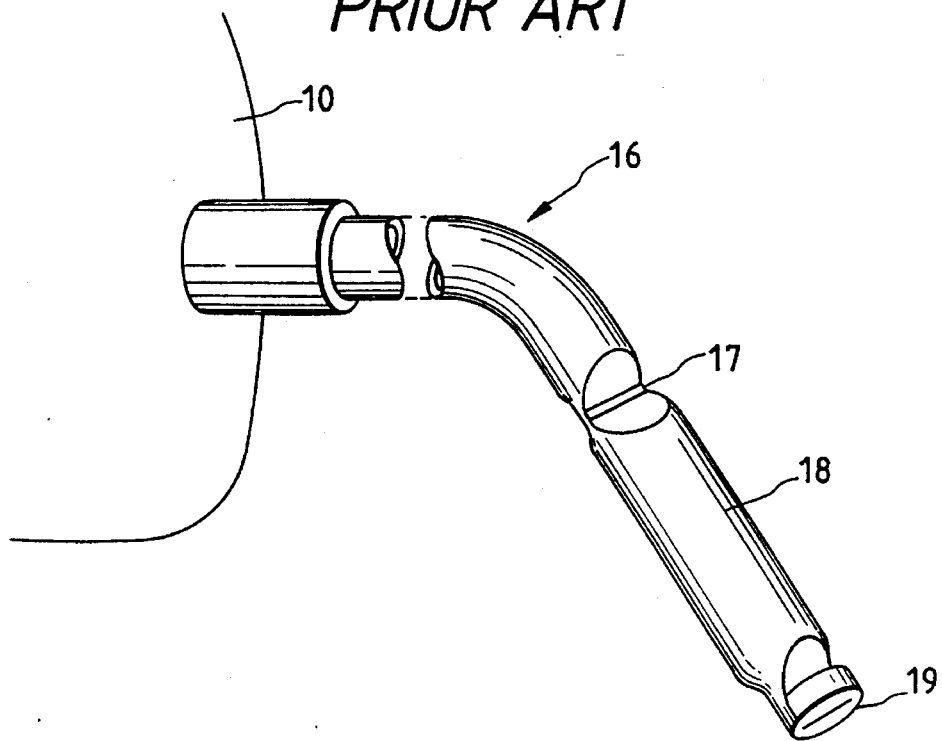
FIG. 9 is a perspective view showing a gas charge port tube in the state where the gas charge port tube is sealed according to the prior art.

In FIG. 9, a pinch portion 17 of the gas charge port tube 16 is first pinched after the evacuation, which is the same as in this preferred embodiment. Subsequently, a distal end 19 is pinched and then brazed to be sealed while a portion 18 from the pinch portion 17 to the distal end 19 remains as it is. According to this conventional sealing manner, the refrigerant gas remains inside the portion 18, and further, the sealing of the gas charge port tube 16 provided by the pinched portions 17 and 19 is somewhat poor. As a result, when the refrigerant gas is combustible as in this preferred embodiment, the explosion or fire becomes a serious problem, particularly, during brazing or welding the distal end 19 using the open flames.

As appreciated from the foregoing description, according to this preferred embodiment, the combustible refrigerant containing, as a main component, hydrocarbon or HFC-152a can be used in the refrigeration system without danger of the explosion or fire. Further, the use of such a refrigerant makes it possible to use the mineral or alkylbenzene lubricating oil.

It may be arranged that the evacuation tube 34 is also sealed like the gas charge port tube 31.

Figure 4:
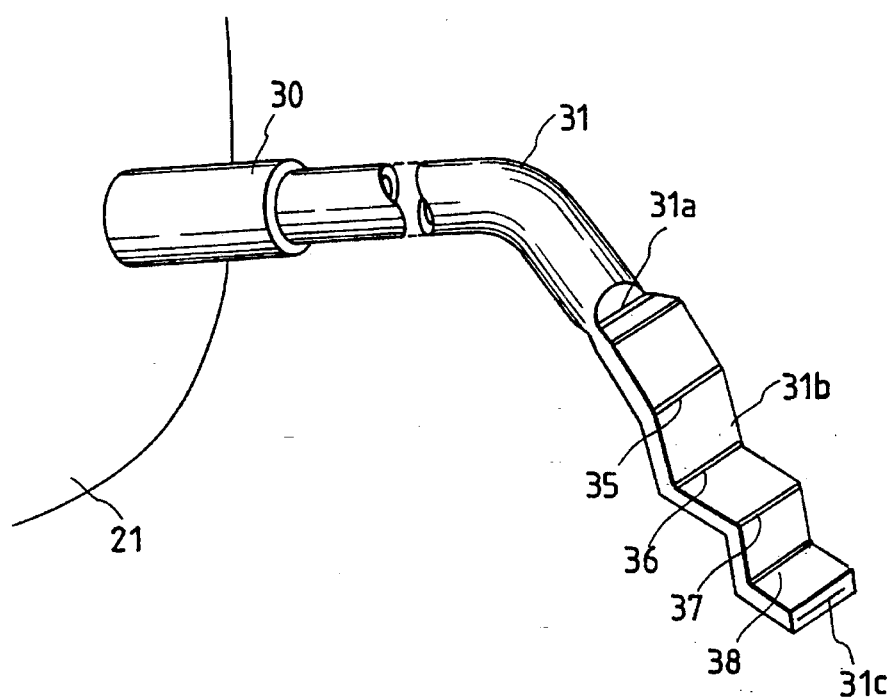
FIG. 4 is a perspective view showing a gas charge port tube shown in FIG. 2, in the state where the gas charge port tube is sealed according to a second preferred embodiment of the present invention.

Now, a second preferred embodiment of the present invention will be described hereinbelow with reference to FIG. 4. In FIG. 4, elements corresponding to those in the first preferred embodiment are represented by the same reference marks or symbols.

As shown in FIG. 4, in the second preferred embodiment, the squashed portion 31b of the gas charge port tube 31 is bent or folded at a plurality of portions 35, 36, 37 and 38. As a result, the sealing effect for the gas charge port tube 31 can be further enhanced.

The other structure is the same as in the foregoing first preferred embodiment.

In the first and second preferred embodiments, it may be arranged that an adhesive, such as, an epoxy resin adhesive is filled in the portion 31b of the gas charge port tube 31 before it is squashed. This arrangement further enhances the sealing effect of the gas charge port tube 31 against leakage of the refrigerant gas.

Figure 5:
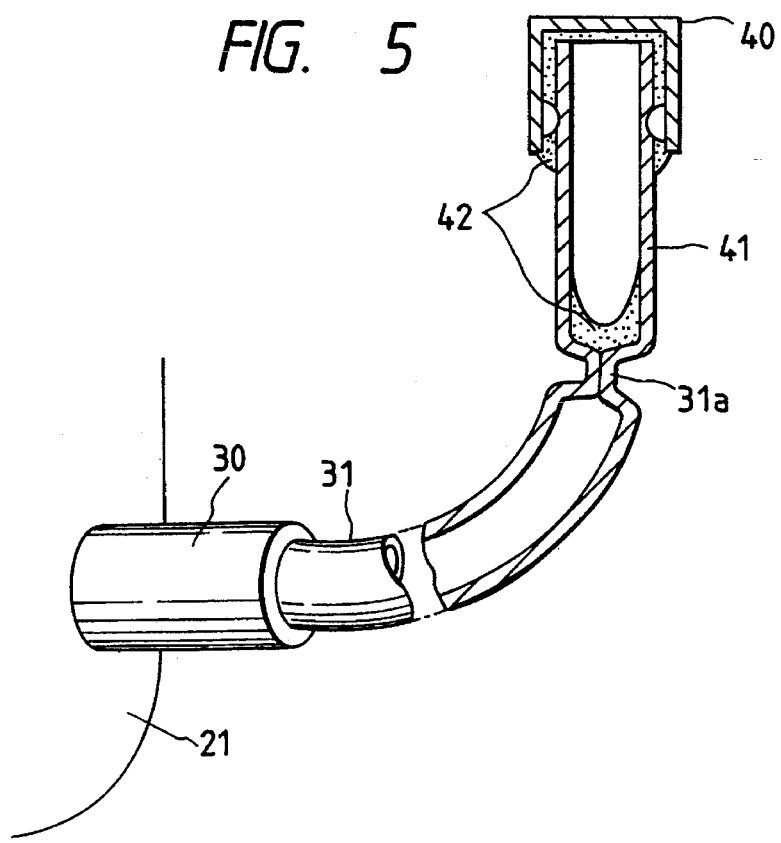
FIG. 5 is a partly-sectioned perspective view showing a gas charge port tube shown in FIG. 2, in the state where the gas charge port tube is sealed according to a third preferred embodiment of the present invention.

Now, a third preferred embodiment of the present invention will be described hereinbelow with reference to FIG. 5. In FIG. 5, elements corresponding to those in the first preferred embodiment are represented by the same reference marks or symbols.

In the third preferred embodiment, after the pinch portion 31a of the gas charge port tube 31 is pinched and the in-process sealing plug 32 is removed as in the first preferred embodiment, an adhesive, such as, a two-part epoxy resin adhesive is filled in a cap 40 which is then mounted onto an end portion 41 extending from the pinch portion 31a to the distal end 31c. As a result, the adhesive is set at portions as indicated by numeral 42 to reinforce the sealing effect provided by the pinch portion 31a so that the gas charge port tube 31 is reliably sealed against leakage of the refrigerant gas.

The other structure is the same as in the foregoing first preferred embodiment.

Figure 6:
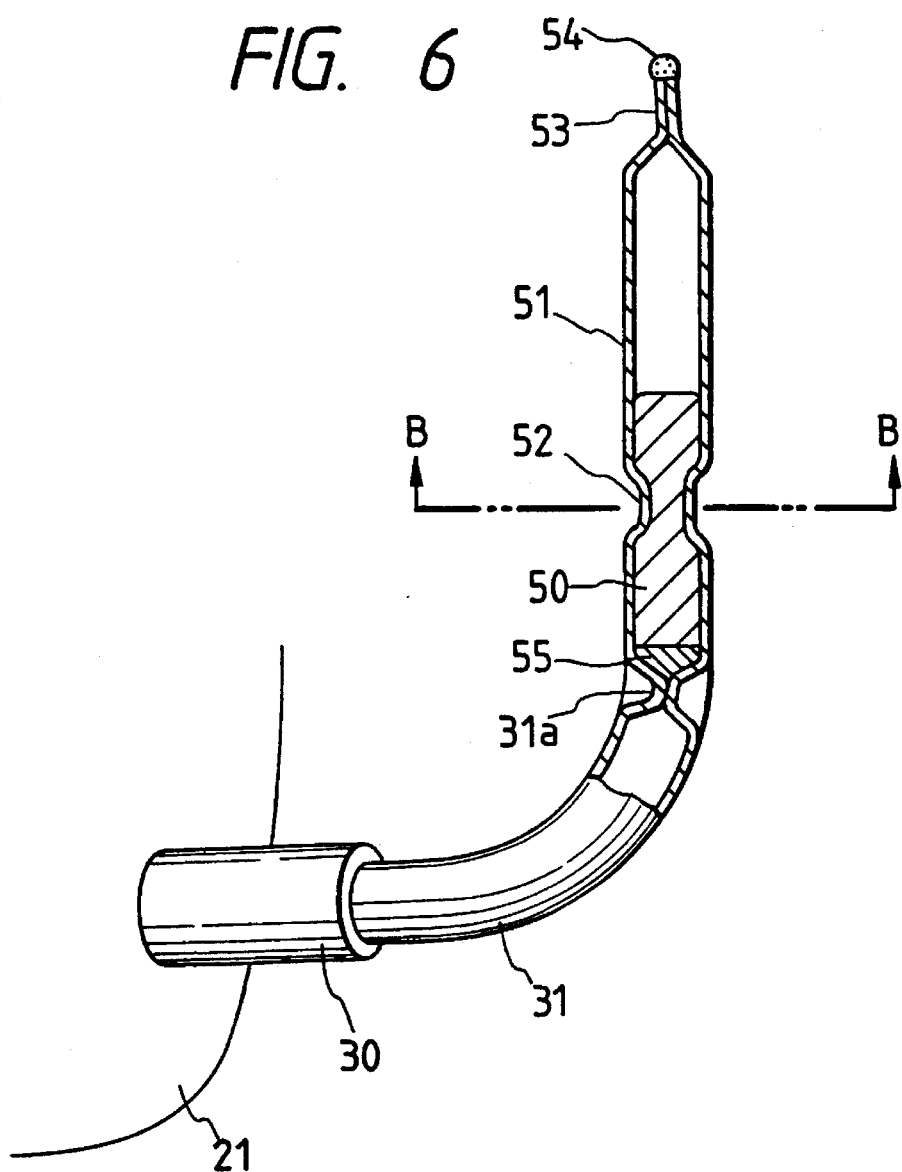
FIG. 6 is a partly-sectioned perspective view showing a gas charge port tube shown in FIG. 2, in the state where the gas charge port tube is sealed according to a fourth preferred embodiment of the present invention.
Figure 7:
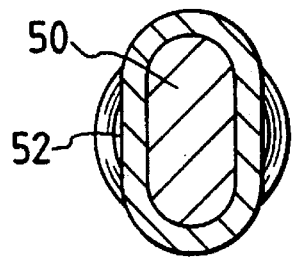
FIG. 7 is a sectional view taken along line B—B in FIG. 6.
Figure 8:
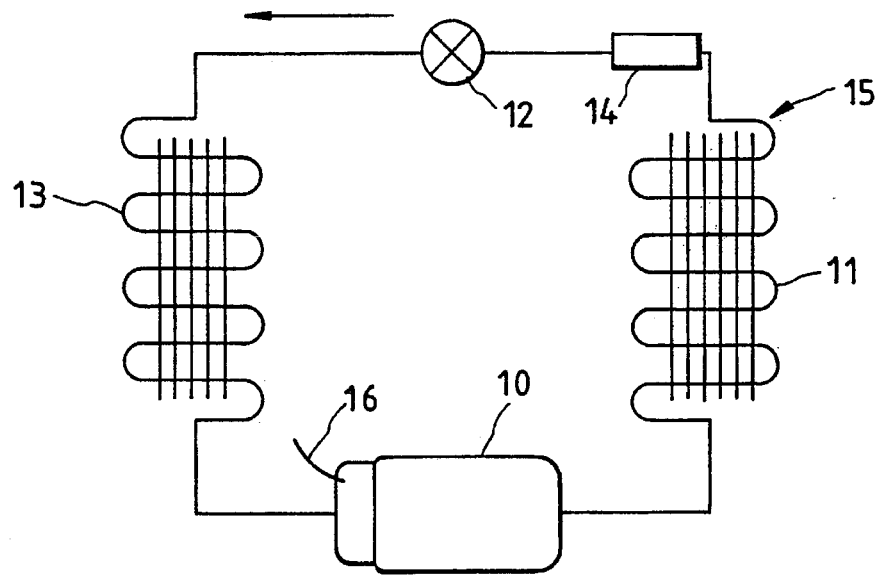
FIG. 8 is a diagram schematically showing a conventional refrigeration system.

Now, a fourth preferred embodiment of the present invention will be described hereinbelow with reference to FIGS. 6 and 7. In FIG. 6, elements corresponding to those in the first preferred embodiment are represented by the same reference marks or symbols.

In the fourth preferred embodiment, after the pinch portion 31a of the gas charge port tube 31 is pinched and the in-process sealing plug 32 is removed as in the first preferred embodiment, an elastomer 50 is inserted into an end portion 51 extending from the pinch portion 31a to the distal end 31c. A diameter of the elastomer 50 is substantially equal to an inner diameter of the end portion 51. The elastomer 50 is made of nitrile rubber which is excellent in oil- and heat-proof or urethane rubber which is excellent in mechanical strength.

After the insertion of the elastomer 50, the end portion 51 is deformed at a portion 52 so as to reduce a sectional area of the portion 52. Accordingly, an inner wall of the portion 52 tightly fits on a periphery of the elastomer 50 all over its circumference so as to ensure the reliable sealing of the gas charge port tube 31 against leakage of the refrigerant gas, as clearly seen from FIG. 7 which is a sectional view taken along line B—B in FIG. 6. Thereafter, a distal end portion 53 of the gas charge port tube 31 is pinched as shown in FIG. 6. Since the leakage of the refrigerant gas is reliably prevented at the deformed portion 52. the distal end portion 53 can be sealed at a portion 54 by means of the soldering using the soldering iron, the brazing using the open flames or the gas or seam welding, without danger of explosion or fire.

In the fourth preferred embodiment, an adhesive 55, such as, an epoxy resin adhesive may be filled in between the pinch portion 31a and the elastomer 50 so as to further enhance the sealing effect.

The other structure is the same as in the foregoing first preferred embodiment.

It is to be understood that this invention is not to be limited to the preferred embodiments and modifications described above, and that various changes and modifications may be made without departing from the spirit and scope of the invention as defined in the appended claims.

What is claimed is:

1. A refrigeration system comprising:

a series of a refrigerant flow passage including therein a compressor, a condenser, an expansion mechanism and an evaporator;

a refrigerant containing, as a main component, one of hydrocarbon and HFC-152a;

a lubricating oil having solubility with said refrigerant: and a fluid tube having a base end hermetically connected to said refrigerant flow passage, a distal end and an intermediate portion extending from said base end to said distal end, said intermediate portion having a first portion which is pinched to be closed and a second portion extending from said first portion to said distal end, said second portion receiving therein an adhesive being set so as to reinforce a sealing effect provided by said pinched first portion.

2. The refrigeration system as set forth in claim 1, wherein said adhesive is disposed at said pinched first portion and at said distal end.

3. The refrigeration system as set forth in claim 1, further comprising a cap attached onto said second portion at said distal end, and wherein an adhesive is further disposed between said cap and said distal end.

4. The refrigeration system as set forth in claim 3, wherein the adhesive received in said second portion and the adhesive disposed between said cap and said distal end are made of epoxy resin.

5. The refrigeration system as set forth in claim 1, wherein said adhesive is made of epoxy resin.

6. The refrigeration system as set forth in claim 1, wherein the adhesive includes an adhesive disposed at said pinched first portion and an adhesive disposed at said distal end made of epoxy resin.

\* \* \* \* \*